United States Patent
Murdock et al.

(10) Patent No.: US 7,353,311 B2
(45) Date of Patent: Apr. 1, 2008

(54) METHOD OF ACCESSING INFORMATION AND SYSTEM THEREFOR

(75) Inventors: Brett W. Murdock, Round Rock, TX (US); William C. Moyer, Dripping Springs, TX (US); Michael D. Fitzsimmons, Crossville, TN (US)

(73) Assignee: Freescale Semiconductor, Inc., Austin, TX (US)

( * ) Notice: Subject to any disclaimer, the term of this patent is extended or adjusted under 35 U.S.C. 154(b) by 11 days.

(21) Appl. No.: 11/142,148

(22) Filed: Jun. 1, 2005

(65) Prior Publication Data

US 2006/0277349 A1 Dec. 7, 2006

(51) Int. Cl.
*G06F 12/00* (2006.01)
*G06F 13/14* (2006.01)
*G06F 13/38* (2006.01)

(52) U.S. Cl. .................................................. 710/244
(58) Field of Classification Search ................ 710/110, 710/244; 712/235
See application file for complete search history.

(56) References Cited

U.S. PATENT DOCUMENTS

| 5,926,628 | A  | * | 7/1999  | Tran et al. ................ 710/113 |
| 6,112,265 | A  | * | 8/2000  | Harriman et al. ........... 710/40 |
| 6,219,724 | B1 | * | 4/2001  | Kim et al. ................. 710/22 |
| 6,275,890 | B1 |   | 8/2001  | Lee |
| 6,389,480 | B1 |   | 5/2002  | Kotzur |
| 6,957,290 | B1 | * | 10/2005 | Rowlands et al. .......... 710/240 |
| 6,996,651 | B2 | * | 2/2006  | Garinger et al. ........... 710/305 |
| 7,051,150 | B2 | * | 5/2006  | Naumann et al. .......... 710/317 |
| 2004/0019733 | A1 | * | 1/2004 | Garinger et al. ........... 710/314 |
| 2004/0193836 | A1 | * | 9/2004 | Ramanadin ................. 712/1 |

* cited by examiner

*Primary Examiner*—Rehana Perveen
*Assistant Examiner*—Mohammed H Rehman

(57) ABSTRACT

A method is disclosed whereby a priority amongst transactions capable of being processed at a common time is determined based upon a transaction identifier associated with each of the transaction. The transaction identifier can either directly indicate a priority amongst the transactions, or use to index storage locations that indicate priority values. The transaction identifiers can be selected to be associated with a transaction by the requesting device or other priority determination module based upon predefined criteria.

7 Claims, 6 Drawing Sheets

| | TRANSACTION IDENTIFIER PRIORITY REGISTER | | | | | | | | | | | | | | |
|---|---|---|---|---|---|---|---|---|---|---|---|---|---|---|---|
| BIT | 31 | 30 | 29 | 28 | 27 | 26 | 25 | 24 | 23 | 22 | 21 | 20 | 19 | 18 | 17 | 16 |
| NAME | | | RID 15 | | | RID 14 | | | | RID 13 | | | | RID 12 | | |
| RESET | 1 | 1 | 1 | 1 | 1 | 1 | 1 | 0 | 1 | 1 | 0 | 1 | 1 | 1 | 0 | 0 |
| | | | | | | | | | | | | | | | | |
| BIT | 15 | 14 | 13 | 12 | 11 | 10 | 9 | 8 | 7 | 6 | 5 | 4 | 3 | 2 | 1 | 0 |
| NAME | | | RID 3 | | | RID 2 | | | | RID 1 | | | | RID 0 | | |
| RESET | 0 | 0 | 1 | 1 | 0 | 0 | 1 | 0 | 0 | 0 | 0 | 1 | 0 | 0 | 0 | 0 |

METHOD OF ACCESSING INFORMATION AND SYSTEM THEREFOR

BACKGROUND

1. Field of the Disclosure

The present disclosure relates generally to electronic systems and more particularly to accessing information for a requesting device.

2. Description of the Related Art

Highly integrated devices, such as micro controllers, can support multiple high speed processing modules, each of which are capable of requesting large quantities of information. Cross-point switches are modules capable of receiving data access requests from requesting modules and in turn interconnecting the requesting module to other modules and systems to obtain the requested data. A cross-point switch typically employs read data consolidation blocks that serve to collect read data from any number of different slave devices, including other cross-point switches, and to determine the order that the consolidated data will be presented to its requesting device. One of two standard methods are typically employed when read collisions occur to determine the order that data involved in the collision is presented to the requesting master. In one standard method, the collision is resolved by passing the data to the master in a FIFO manner based on when the request was originated. In the other standard method, the collision is resolved by providing the information based upon a priority of a port connection of the requesting devices.

While the above-described standard methods provide for prioritization amongst requesting devices and prioritization based upon the temporal order of requests, they fail to facilitate the prioritization of access requests based in alternative manners. A method and apparatus for allowing greater flexibility in assigning priorities to access requests and other transactions would be useful.

BRIEF DESCRIPTION OF THE DRAWINGS

The present disclosure may be better understood, and its numerous features and advantages made apparent to those skilled in the art by referencing the accompanying drawings.

DESCRIPTION OF THE PREFERRED EMBODIMENT(S)

The present disclosure presents a method and system for using transaction identifiers to determine an order that a plurality of pending transactions associated with the transaction identifiers should be completed. In one embodiment, transaction identifiers are used as an index into a table to determine corresponding priorities of the transaction requests. The priority indication is to control the order that concurrently available transaction requests are processed.

In one embodiment, transaction identifiers are used to facilitate prioritization amongst requests initiated from a common requesting device. For example, a transaction identifier for a specific transaction request is associated with a priority relative to other transaction requests from the same requesting device. By providing the transaction identifier as part of the initial transaction request, and to any subsequent transaction request based upon the initial transaction request, it is possible for each subsequent device in a system that is responsible for processing information related to the initial transaction request to determine a relative priority amongst concurrently pending requests from a common initiating device based upon the transaction identifier. The present disclosure will be better understood with reference to FIGS. 1-10 discussed below.

For purposes of illustration, requesting devices herein are described as master devices, in that they can act as bus masters in the embodiment described. It is also noted that devices that are not bus mastering devices can use the techniques described herein. Furthermore, the transactions requested by a requesting device are described herein as data access requests, such as read and write requests. It will be appreciated that the techniques described herein can by used with any transaction request that associates a transaction identifier with the request.

Figure 1:
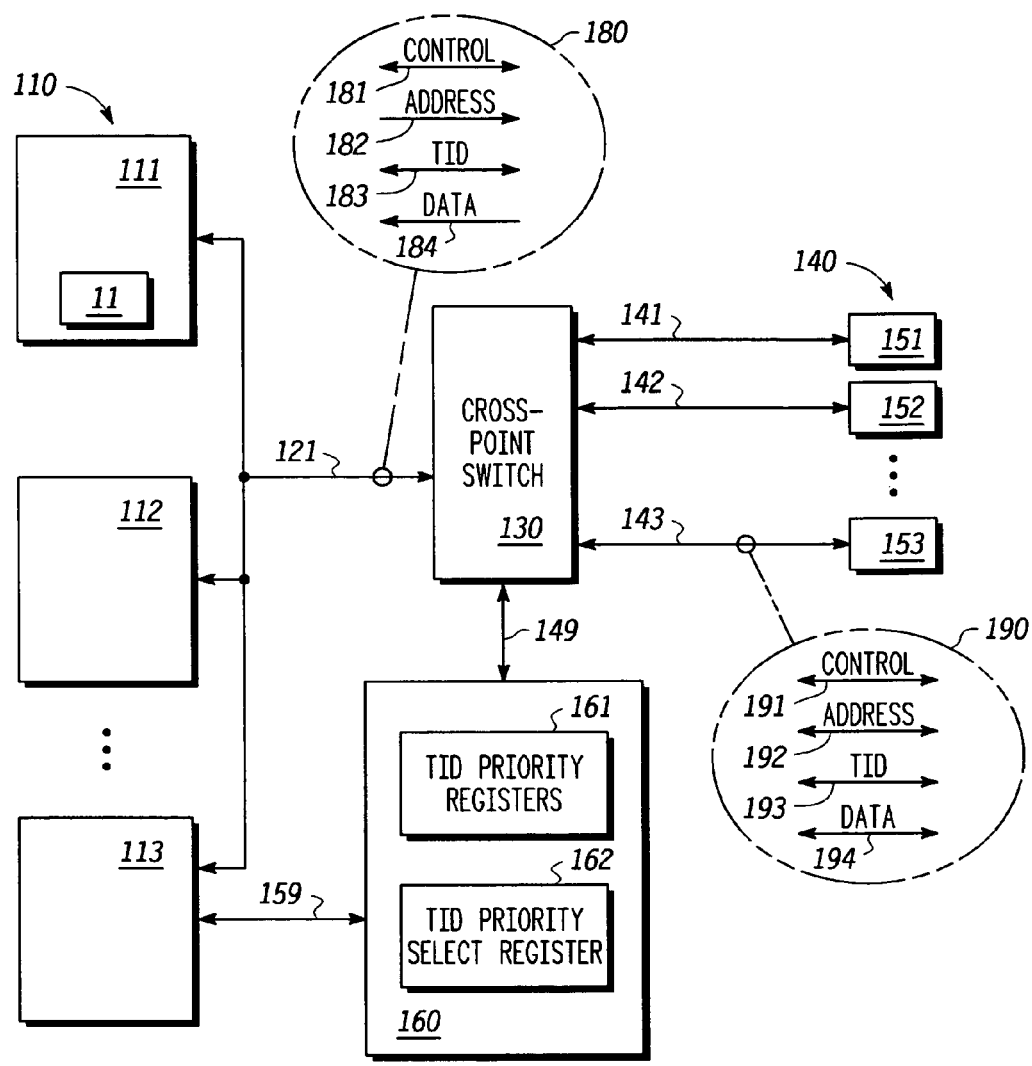
FIG. 1 illustrates a block diagram of a system in accordance with a specific embodiment of the present disclosure.

FIG. 1 illustrates a system 100 that includes a plurality of bus masters 110, a plurality of slave devices 140, a cross-point switch 130, and registers 160.

The plurality of bus masters 110 include bus master 111, bus master 112, and bus master 113. Each of the bus masters 111-113 is a data processor that can act as a requesting device, and are connected to the cross-point switch 130 through bus 121. Breakout bubble 180 indicates specific information transmitted over bus 121. Specifically, the bus 121 transmits control information 181, address information 182, transaction identifiers 183, and data information 184, respectively. It will be appreciated that the information illustrated in breakout bubble 180 can be transmitted in parallel or serially over bus 121 connections. While bus 121 is generally shown to be shared amongst bus masters 110, an alternate embodiment would support each bus master 110 being connected to cross-point switch module 130 through its own dedicated bus. Greater data throughput can be realized by providing each bus master 110 a dedicated bus to the cross-point switch module 130.

The individually numbered elements of the system of FIG. 1 are electronic devices, also referred to as modules, that can be formed together on a common integrated semiconductor circuit (IC) substrate, or partitioned and formed on more than one IC substrate. In a specific embodiment, at least one requesting device, such as device 111, cross-point switch 130, and registers 160 are formed on a common IC substrate. One or more of the slave devices 140 reside on the same IC substrate as the cross-point switch 130, while one or more other slave devices 140 reside on a different IC substrate of a larger system.

Slave devices 140 include slave device 151, slave device 152, and slave device 153. Each of the slave devices 140 can be accessed independently by the cross-point switch 130 to access information based upon requests by masters 110. Slave device 151-153 are connected to the cross-point switch module 130 through buses 141-143, respectively. Breakout bubble 190 illustrates specific information transmitted over bus connections associated with a representative slave bus 143. Specifically, bus 143 transmits control signals 191, address information 192, transaction identifier 193, and data information 194.

Cross-point switch module 130 is further connected to registers 160 through connection 149, which include Transaction ID (TID) Priority Register module 161, which stores priority information associated with specific transaction identifiers, and TID Priority Select Register module 162, that stores select information to identify one of a plurality of TID Priority Register sets in module 161, is connected to the TID Priority Register module 161. In the specific embodiment, the bus master 113 is illustrated as connected to the modules 161 and 162 via bus 159.

In accordance with a specific embodiment, the bus master devices 110 can each initiate one or more data access requests, each of which includes a transaction identifier that is assigned by a transaction identification module such as module 11 of master 111. The data access requests, which include transaction identifiers, are provided to the cross-point switch for further processing. In one embodiment, the cross-point switch will provide a corresponding transaction request to an appropriate slave device for each transaction request it receives from a bus master. In one embodiment, the transaction identifier received from the requesting device is included as part of the corresponding transaction request to the slave device. In an alternate embodiment, the cross-point switch provides a different transaction identifier to the slave device is but will maintain an association between the original transaction identifier received at the cross-point switch from the requesting device and the transaction identifier provided to the slave device from the cross-point switch.

When a slave device has processed the corresponding transaction request from the cross-point switch it will initiate its own transaction request with the cross-point switch, or other device, to facilitate the transfer of information originally requested by a master. As part of its transaction request, the slave device will forward or return the transaction identifier it received from the cross-point switch, so that the cross-point switch can not only determine which transaction the information being transferred is associated with, but can also determine a relative priority amongst other transaction requests pending for the same requesting device based upon the transaction identifier.

For purposes of discussion and illustration herein, transaction requests are discussed with respect to data access requests, which themselves are assumed to be read requests initiated by one of the masters 110; though it will be appreciated that write requests are also readily accommodated by the concepts described herein. Operation of the system 100 will furthermore be discussed for an embodiment wherein bus master 111 is initiating a plurality of read requests.

Figure 2:
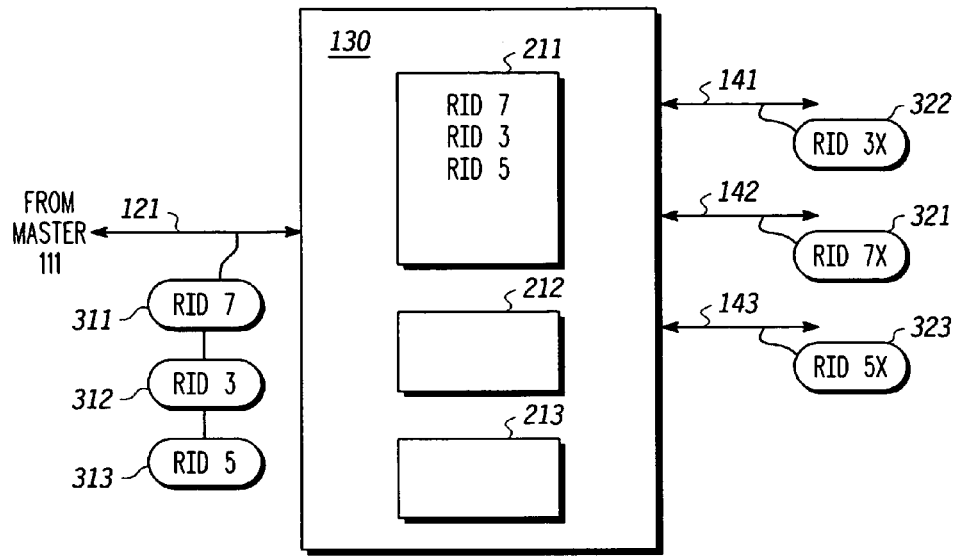
FIG. 2 illustrates a block diagram of a cross-point switch portion of the system of FIG. 1 in accordance with a specific embodiment of the present disclosure.

FIG. 2 illustrates a plurality of read requests 311-313 between cross-point switch module 130 and bus master 111. Each read request 311-313 is represented as a bubble with a corresponding transaction identifier. Read request 311 is associated with transaction identifier RID7; read request 312 is associated with transaction identifier RID3; and read request 313 is associated with transaction identifier RID5.

The temporal order that read requests 311-313 are initiated by bus master 111 is indicated by the ascending order of the reference numbers 311-313, with read request 311 being initiated first. The temporal order of transactions related to requests 311-312 is further illustrated in FIG. 3. Specifically, various transaction requests are illustrated as bubbles containing transaction identifiers RID7, RID3 and RID5 to indicate which request a specific transaction request is associated. For example, initial transaction requests are received at cross-point switch 130 from master 111 at times T1, T2 and T3, respectively.

In response to receiving read request 311 at time T1, the cross-point switch module 130 generates its own read request 321 at time T2 (FIG. 3) on bus 142 to request the information associated with read-request 311 from slave device 152. The transaction identifier RID7x of access request 321 may be the same as, or different than, transaction identifier RID7. In the event transaction identifier RID7x has a different value than transaction identifier RID7, cross-point switch 130 will maintain a cross reference of the value of RID7x to the value of RID7 such that they are associated with each other.

Note that cross-point switch module 130 has the ability to determine which slave device contains information requested by masters 110. For purposes of discussion, it is assumed that each slave device can simultaneously process multiple requests, and therefore is provided a transaction identifier that will be returned to the cross-point switch when data is available for transfer. However, it will be appreciated that slave devices that only handle a single transaction request at a time can also be used, and the transaction identifier of a current request being processed by such a slave will be maintained by the cross-point 130.

In a similar manner described with respect to read request 311, read requests 312 and 313 are received at cross-point switch module 130 from master 111 at times T2 and T3 and are forwarded at times T4 and T5 as subsequent access requests 322 and 323, respectively, on busses 141 and 143.

Note that modules 211-213 of cross-point switch 130 in FIG. 2 correspond to portions of cross-point switch 130 where information relating to pending read requests from bus masters 111-113 are respectively maintained. For example portion 211 represents a pending transaction identification module for requesting device 111.

Figure 3:
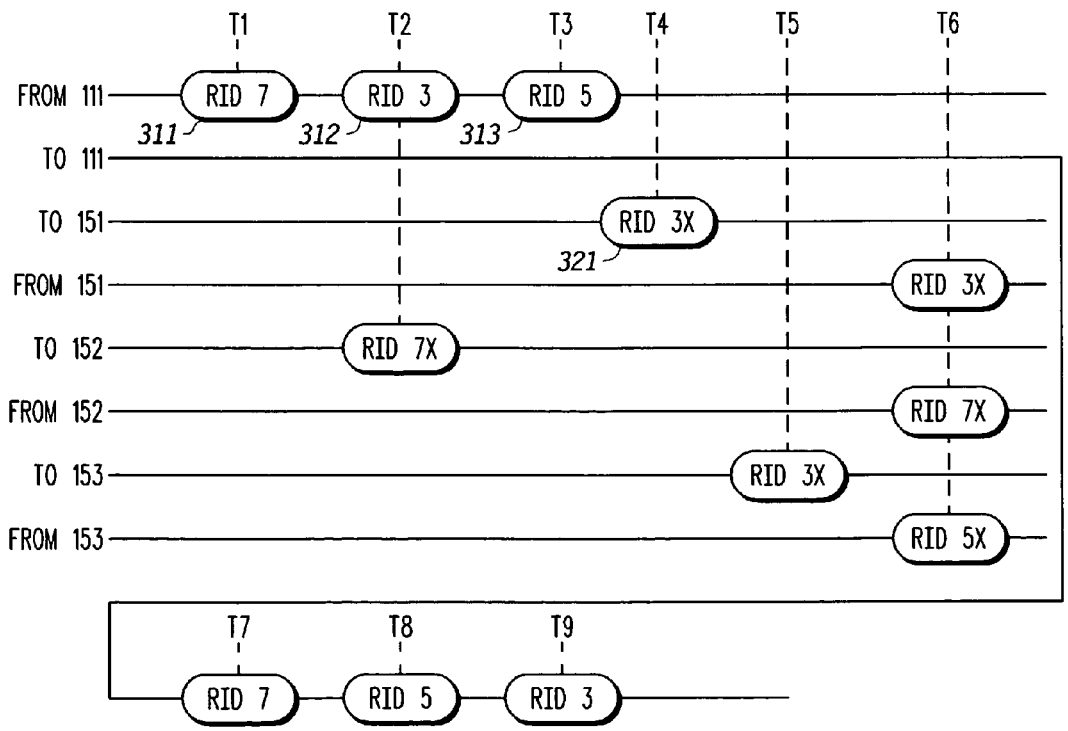
FIG. 3 illustrates a time line indicating various transaction requests based upon transaction requests initiated by a common requesting device.

Because of variations in latency of slave devices, it is possible for information from two or more of access requests 321-323, which were initiated by master 111 at different times, to be available for processing, i.e. receipt, at the cross-point switch 130 at the same time. This is illustrated in FIG. 3, at time T6, where each of three slave devices are providing to the cross-point switch an indication that it is ready to provide information to master 111. Note that each indication from a slave at time T6 has a transaction identifier that is associated with a transaction identifier from master 111, thereby allowing master 111 to be identified as a destination, as well as for use by the cross-point switch 130 to determine a priority amongst requests initiated by the master 111. Note that the indications from the slave devices are themselves transaction requests provided to the cross-point switch 130 in response to data being ready for transfer. Referring to FIG. 3, all three slaves are indicating at time T6 that information associated with pending requests, having transaction identifiers RID3x, RID5x, and RID7x, are ready to be transferred.

Figures 4, 5:
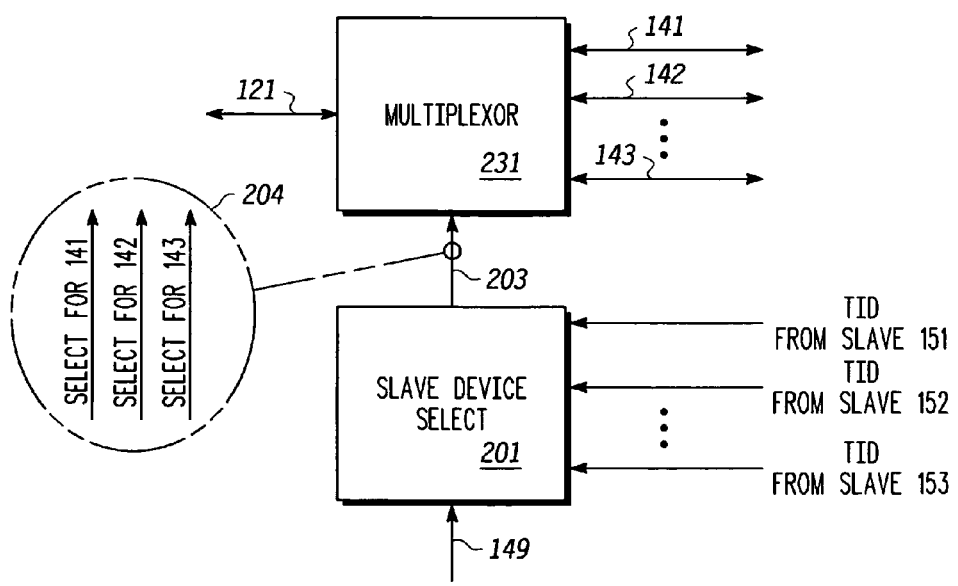
FIG. 4 illustrates in tabular form a representation of a register in accordance with a specific embodiment of the present disclosure.
FIG. 5 illustrates in block diagram form a portion of the cross-point switch of FIG. 1 in greater detail in accordance with a specific embodiment of the present disclosure.

In accordance with the present disclosure, a priority of the information associated with transaction identifiers RID3x, RID5x, and RID7x, all of which is for master 111, can be determined by the cross-point switch 130 based upon the transaction identifier received from the slave device. In one embodiment, priority values associated with specific transaction identifiers are fixed. Alternatively, priority value associated with a specific transaction identifier is variable and determined by using the transaction identifier as a pointer to index a register, or other storage location, containing a priority value. One embodiment of a register that can be accessed using a pointer based on a transaction identifier is illustrated in FIG. 4. Specifically, the transaction priority register illustrated stores a 4-bit priority value for each of sixteen transaction identifiers RID15-RID0. Upon reset, each transaction identifier is assigned a priority value in ascending order that corresponds with its individual identifier index. Therefore, RID0 has a lower priority value (0x0) than RID1 (0x1), which has a lower priority value than RID2 (0x2), and so on up through transaction identifier RID15 (0xF). One or more registers of the type illustrated in FIG. 4 can be stored in TID priority register 161 and selected by information stored in TID Select Register 162.

Referring back to FIG. 2, it will be appreciated that the transaction identifier RID7 associated with data access request 311 was selected by bus master 111, which assigned a mid-level priority value to data access request 311, assuming the reset priority values of FIG. 4 are being used. The data access request 312 has been associated with transaction identifier RID3 by the bus master 111. By selecting transaction identifier RID3, bus master 111 has indicated that data access request 312 has a lower priority than the data access 311. Therefore, in the event that data associated with the data access 311 is available for transfer to the bus master 111 at the same time as data associated with the data access 312, the cross-point switch module 130 can prioritize data access 311 over data access 312 based upon priorities of the transaction identifiers RID7 and RID3.

The data access request 313, in the illustrated example, is associated with transaction identifier RID5 by the master 111. Assuming that data access requests 311 and 312 are currently pending, selection of the transaction identifier RID5 assigns a priority to data access request 313 that is higher than the priority of data access request 312 (RID3), but lower than the priority of data access request 311 (RID7). By maintaining the transaction identifiers or each data access request, it is possible for devices responsible for returning information to master 111 to determine which requested information should be first returned to master 111 when requested data is available simultaneously. This is illustrated in FIG. 3, where cross-point switch 130 provides an indication, which includes transaction identifier RID7 to requesting device 111 at time T7. Based upon the transaction identifier RID7, the requesting device 111 will associate the available information with request 311, which was initiated at time T1 by requesting device 311. When this transfer is complete, the cross-point switch 130 provides an indication, which includes transaction identifier RID5, to requesting device 111 at time T8. Based upon the transaction identifier RID5, the requesting device 111 will associate the available information with request 313, which was initiated at time T3 by requesting device 111. When this transfer is complete, the cross-point switch 130 provides an indication, which includes transaction identifier RID3 to requesting device 11 at time T9. Based upon the transaction identifier RID3, the requesting device 111 will associate the available information with request 312, which was initiated at time T2 by requesting device 111.

The ability of a bus master to select a transaction identifier that not only uniquely identifies a specific data access request for purposes of tracking the request, but that also can be used to indicate a priority of the request to the cross-point switch module 130 represents an advantage over previous methods, which are unable to prioritize multiple requests from the same master.

In accordance with a further embodiment of the present disclosure, one or more of the bus masters 110 can modify priority values assigned to the transaction module identifiers. For example, one or more of the bus masters 110 can write to a storage location, such as register 161 of FIG. 1 to re-prioritize the transaction identifiers. For example, if subsequent to initiating the data access requests 311-313 described with reference to FIG. 2 requesting device 111 determines that the data associated with data access 311 is actually less important than the other two data access requests, the priority values stored within the transaction priority register module 161 can be modified to assign transaction identifier RID7 a lower priority than the transaction identifiers RID3 and RID5. For example, RID7 can be assigned the smallest priority value 0x0. In this manner, the cross-point switch module 130 is be able to determine that data associated with data access requests 312 and 313 is more important and should be returned prior to the data access request associated with request 311 if either are available for transfer at a common time.

Note that FIG. 1 illustrates master 113 as being connected to registers 160, though not specifically illustrated, each of the bus masters 110 can be connected to registers 160 for purposes of modifying their contents.

TID Select Register module 162, illustrated in FIG. 1, is a storage location that allows for selection one of one of a plurality of transaction priority registers. For example, multiple transaction priority registers of the type illustrated in FIG. 4 can reside within register module 161. For example, each master can have one or more of its own Priority Registers. Alternatively, Priority Registers may be shared amongst the masters. A specific Priority Register can be selected for use by a select indicator stored in the TID Priority Register Select register module 162.

FIG. 5 illustrates a control portion of cross-point switch 130 in accordance with a specific embodiment of the present disclosure. Specifically, FIG. 5 illustrates a multiplexor 231 and a slave device select module 201 that function to arbitrate amongst data being returned to one or more of the bus masters 110. For purposes of illustration, operation of the multiplexor 231 and slave device select module 201 will be discussed with respect to bus master 111.

The multiplexor 231 is connected to each slave bus 141-143 and receives a select signal 203 that indicates which one of the slave buses 141-143 should be operably connected to bus master 111 through bus 121. Select signal 203 from the select module 201 is illustrated in breakout bubble 204 to comprise a plurality of select signals, of which only one can be asserted at any given time to indicate which one of the plurality of slave buses has the access request with the highest priority. The slave device select module 201, which asserts one of the plurality of select lines, receives transaction identifiers from each slave device currently available to transmit data. Control logic associated with the slave device select module 201 asserts a select signal associated with the slave device having the transaction identifier with the highest priority value. For example, if slave devices 140 simultaneously attempt to provide information to cross-point switch module 130 for data access requests 311-313, cross-point switch 130 identifies the slave device that is to first provide its information to bus master 111 based upon the priority associated with its transaction identifier. In accordance with a specific embodiment, the transaction identifiers of each access request requiring attention by cross-point switch module 130 are used to index the Priority Registers module 161 to determine a transaction identifier having the highest priority value.

Figure 6:
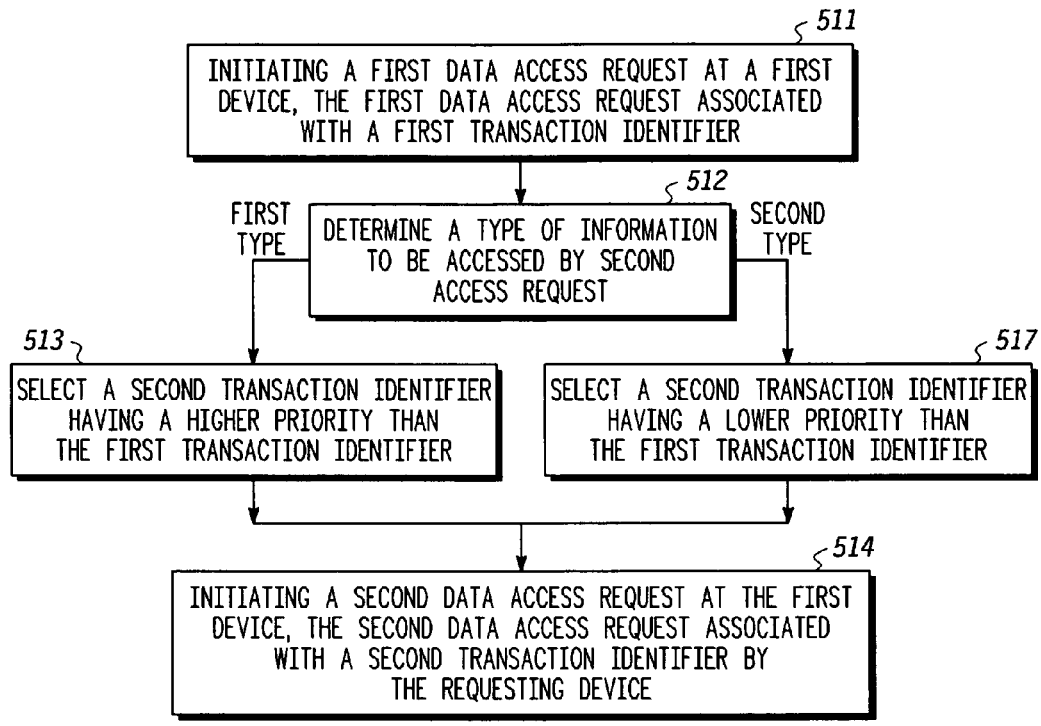
FIGS. 6-8 illustrate in flow diagram form methods in accordance with specific embodiments of the present disclosure.

FIG. 6 illustrates a method in flow diagram form in accordance with the present disclosure. At step 511, a first data access request is initiated at a first device, where the first data access request is associated with a first transaction identifier. As previously discussed, the first transaction identifier is a unique identifier associated with a specific data access request that allows a request to be tracked as the requested data access is performed. Because data returned to a requesting device includes a transaction identifier, it is possible for the requesting device to differentiate between multiple pending access requests.

At step 512, a type of information to be accessed by a second access request is determined. Examples of types of information can include requests for source specific information, or information requested in response to specific state conditions of a requesting device. Other types can include data for a data access, which can take priority over data for an instruction access, or a non-cacheable data can have priority over cacheable data. Depending upon the type of information, either a second transaction identifier is selected at step 513 having a higher priority than the first transaction identifier, a lower priority than the first transaction identifier or the same as the first transaction. Once the second transaction identifier is selected at one of steps 513 or 517 a second data access request is initiated at step 514 by the first device that is associated with the second transaction identifier.

Note that in an alternate embodiment, the requesting device could select the transaction identifier for a new data access request to be the same transaction identifier as that of a currently pending request. In this embodiment, the completion order of data access requests having the same transaction identifier would have to be predefined in a manner that is determinate. For example, the completion data access requests having the same transaction identifier would be in order, i.e. first requested first finished, or in reverse order, i.e. last requested first finished. For example, in FIG. 2, a request subsequent to request 313, which has RID5 as a transaction identifier, could be a request also having RID5 as its transaction identifier.

The method of FIG. 6 is advantageous in that it allows a requesting device to prioritize its access requests based upon a transaction identifier selected. In the embodiment described with respect to FIG. 6, transaction identifiers are selected based upon their priority rankings. It will be appreciated that in an alternate embodiment the requesting device may not be able to select a specific transaction identifier, but instead would control a priority ranking assigned to a specific transaction identifier.

Figure 7:
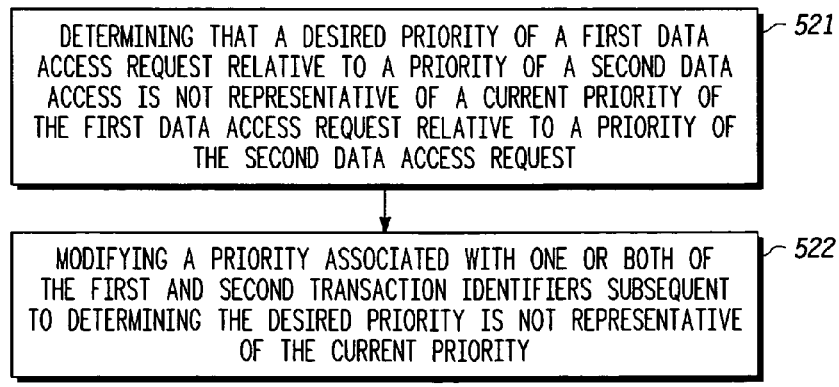

FIG. 7 illustrates a method in flow diagram form in accordance with the present disclosure that can be used to modify transaction identifier priority for a pending access request. At step 521, a determination is made that a desired priority of a pending first data access request relative to a pending second data access request is not representative of a current priority of the pending first data access request relative to a pending second data access request. For example, an application program or operating system, at the time a second access request was issued may have determined that the second access request was more important than the first access request, however, subsequently, it is determined that the first data has become more important than the second data.

At step 522, a priority ranking associated with one or both of the first and second transaction identifiers is modified to update their current priorities to be consistent with their desired priorities. The ability to dynamically modify priorities of pending data access requests is advantageous over previous methods, which failed to allow data requests to be prioritized, or the prioritizations to be modified.

Figure 8:
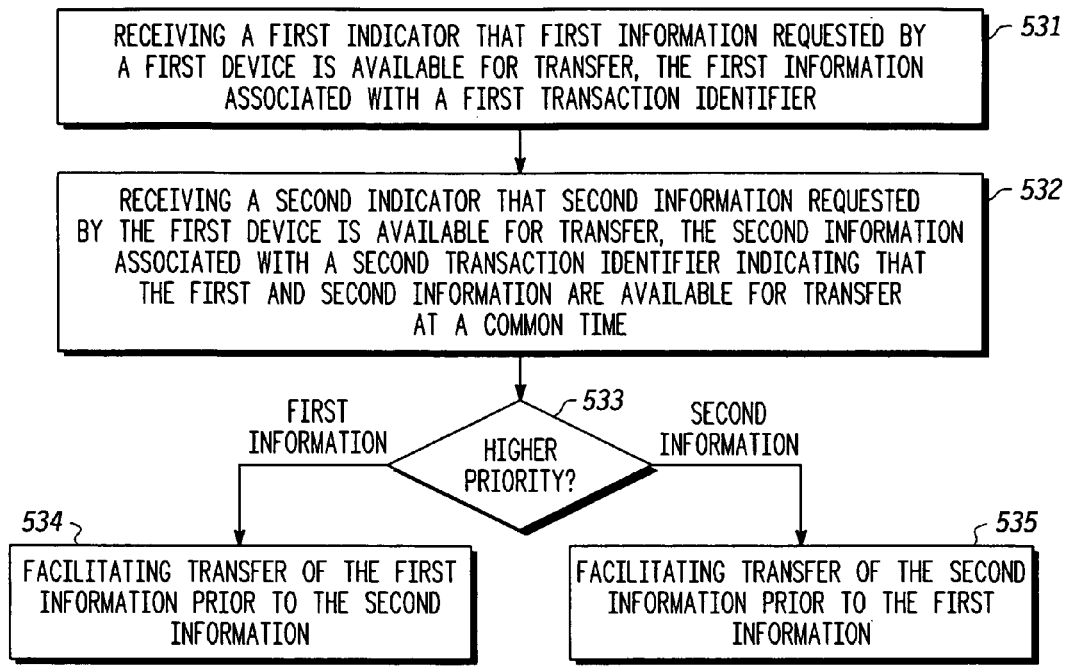

FIG. 8 illustrates a method in flow diagram form in accordance with a specific embodiment of the present disclosure. At step 531, a first indicator is received indicating that first information requested by a requesting device is available for transfer. The first information is associated with a first transaction identifier; a requesting device that initiated a request for the first information made this association. In accordance with a specific embodiment herein, the first indicator would include handshake information received at a cross-point switch from a slave device in response to requested information associated with a specific transaction request being available for transfer from the slave to the cross-point switch.

At step 532, a second indicator is received indicating that second information requested by the same requesting device as requested the first information is available for transfer. The second information is associated with a second transaction identifier, this association was made by the requesting device that initiated a request for the second information, which is the same requesting device that initiated the request for the first information. In accordance with a specific embodiment herein, the second indicator is received by cross-point switch from a slave device in response to a data access request being processed on behalf of the requesting device and creates a situation where the first information and the second information are available to be transferred to the requesting device at a common time.

It will be appreciated that the first and second indicators can be received at the switching device during a common clock cycle, e.g., a substantially simultaneous receipt of the first and second indicators. Alternatively, the first and second indicators can be received by the switching device at different clock cycles, but indicate an availability of the first and second information such that it can be determined that the first and second information will be available for transfer to their common requesting at a common time. For example, in response to receiving the first indicator, the cross-point switch 130 can determine (e.g., by look-up table or by design) that the data transfer associated with the first indicator will be available for transfer in 2 clock cycles and last for 16 clock cycles. If the second indicator is received one clock cycle after the first indicator, and the controller determines that the second information will also be available for transfer in two clock cycles and last 16 clock cycles, it can be determined by the cross-point switch 130 that the first and second information will be available for transfer at a common time, e.g., an overlap of 15 clock cycles.

At step 533 a determination is made whether the first information or the second information has a higher priority. As previously discussed, the priority of information can be determined based upon a transaction identifier associated with the information. In one embodiment the priority information is fixed based upon the transaction identifier. In an alternate embodiment, the priority information is read from a register based upon a value of the transaction identifier.

When it is determined at step 533 that the first information has a higher priority than the second priority flow proceeds to step 534, where a transfer of the first information is facilitated prior to a transfer of the second information.

When it is determined at step 533 that the second information has a higher priority than the second priority flow proceeds to step 535, where a transfer of the second information is facilitated prior to a transfer of the first information.

In other embodiments, other factors such as the amount of overlap can be considered in determining whether to select the highest priority request. For example, if a lower priority request will delay a higher priority request by a single clock cycle, or other pre-determined quantity, the lower priority transfer can be initiated. Also, a lower priority transfer could be stalled, once started, to allow a higher priority transfer to compete.

The method of FIG. 8 is advantageous in that it provides a data access controller the ability to prioritize data access requests from a common controller in an efficient manner.

Figure 9:
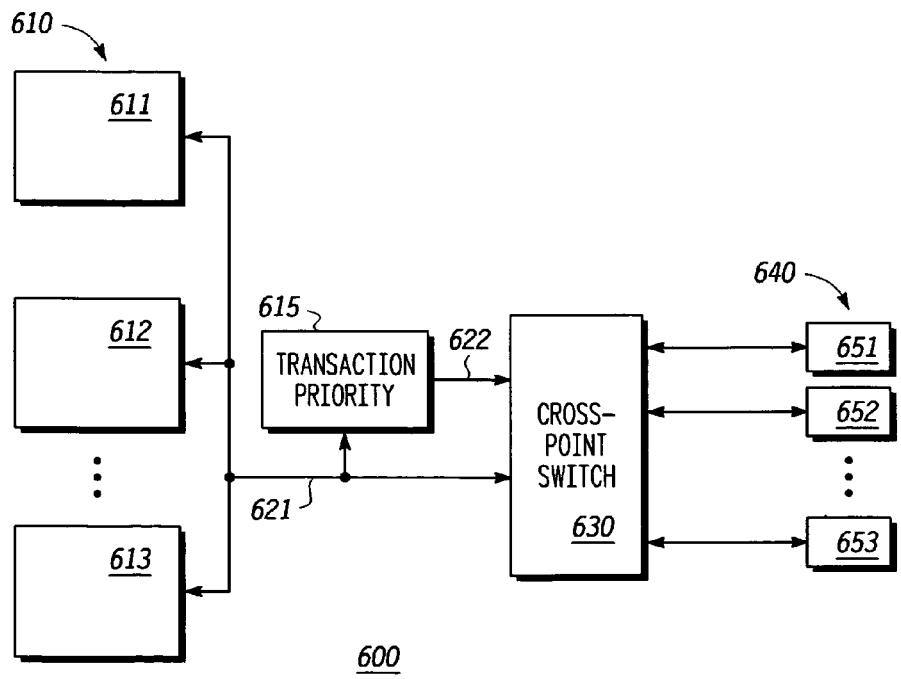
FIG. 9 illustrates a block diagram of a system in accordance with a specific embodiment of the present disclosure.

FIG. 9 illustrates a system 600 that is similar to system 100 of FIG. 1. System 600 includes a plurality of bus masters 610, a plurality of slave devices 640, a transaction priority module 615, and a cross-point switch 630. Elements similarly number to elements of FIG. 1 perform similar functions. In addition, system 600 may optionally include registers similar to registers 160 of FIG. 1 for the purposes determining priority values as described herein.

In operation, system 600 provides transaction requests, such as read requests, for processing by cross-point switch 630. However, instead of a requesting device, such as device 611, assigning a transaction identifier based upon a priority of its request, the transaction priority module 615 provides additional information to nodes 622 indicative of the priority. In one embodiment, the additional information provided to nodes 622 is treated as an extension of the transaction identifier associated with requesting device 611. For example, each read request from a requesting device could be identified by incrementing a value of previously assigned TID assigned by the requesting device. For example, a value of a transaction identifier assigned to a first read request from requesting device 611 could be equal to 0x0, while a next transaction identifier value from requesting device 611 would be 0x1, and so on through 0xF, at which the TID values could continue with the value 0x0.

By monitoring the address range, or other information present on system bus 621, the transaction priority module 615 can generate a value that can be used to indicate a priority of a data access request. For example, a value of 0x7 from the transaction priority module 615 can be combined with the transaction identifier from the requesting device to form the transaction identifier received at cross-point switch 630, and associated with requesting device 611. In one embodiment, the cross-point switch 630 will treat the portion of the TID from module 615, the value 0x7 in the present example, as a priority value of 0x7 used prioritize the return of data. In an alternate embodiment, the cross-point switch 630 will treat the portion of the TID from module 615 as an index to access a storage location containing prioritization values of the data access request, as previously discussed.

Figure 10:
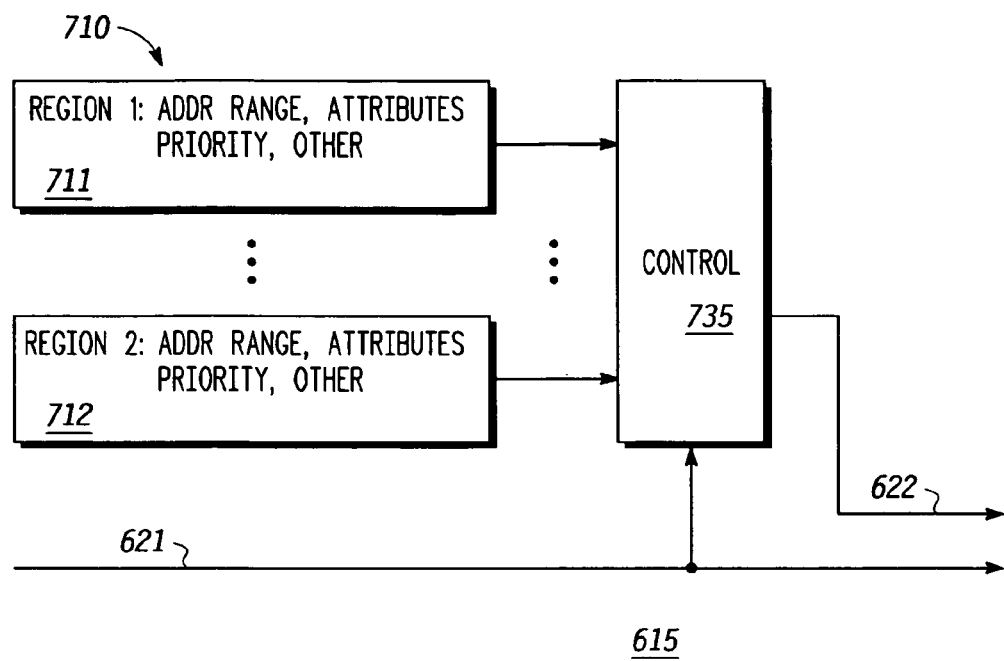
FIG. 10 illustrates a block diagram of a portion of FIG. 8 in greater detail in accordance with a specific embodiment of the present disclosure.

FIG. 10 illustrates a specific embodiment of the transaction priority module 615 that includes registers 710, and Control module 735. In operation, registers 710 include a plurality of registers including registers 711 and registers 712 that can be configured with transaction specific information used to determine a value of the additional information provide at nodes 622. For example, when the transactional specific information is a read request, the transactional specific information can include one or more of: an address range of the requested information; access attributes, such as read/write indicators; cacheability of a request; size of a request; priority indication information from the requesting device; and other determinable access information. By monitoring values on bus 621, Controller Model 735 determines whether or not criteria stored at one or more of the registers 710 is applicable. Based on this comparison, the additional side band information can be provided on nodes 622. By providing the additional information in this manner, priorities of specific requests can be determined by the cross-point switch 630 as previously described. The specific side band information provided to nodes 622 can include simple transaction priority information, and will typically be considered part of the system bus information relative to the downstream receiving devices, such as cross-point switch 630. In one embodiment, the sideband information is an extension of the transaction identifier used by cross-point switch 630, and is provided to, and returned from, downstream slave devices. As previously described, maintaining the transaction identifier in this manner allows the cross-point switch to prioritize amongst information requested by a common requesting device that is simultaneously available from a plurality of slave devices based upon transaction identifiers provided by the plurality of slave devices to the cross-point switch 630.

In operation, the attribute information stored in one of the registers of register sets 710 can be maintained by each individual requesting device, or by one requesting device based upon either system requirements or application requirements.

Priority indication values stored within registers sets 710, can be used to assign a fixed priority value or an index location where a value can be found. The system 600 can modify prioritization by changing values within the register sets 710, by modifying values at index locations, or both.

Note that not all of the activities described above in the general description or the examples are required, that a portion of a specific activity may not be required, and that one or more further activities may be performed in addition to those described. Still further, the order in which activities are listed are not necessarily the order in which they are performed. After reading this specification, skilled artisans will be capable of determining what activities can be used for their specific needs or desires.

In the foregoing specification, principles of the invention have been described above in connection with specific embodiments. However, one of ordinary skill in the art appreciates that one or more modifications or one or more other changes can be made to any one or more of the embodiments without departing from the scope of the invention as set forth in the claims below. For example, while the previous disclosure has been with respect to each master unilaterally controlling its selection of its transaction identifiers, it will be appreciated that to accommodate situations where multiple masters share a common bus that it may be desirable for the assignment of transaction identifiers to be coordinated amongst the masters. One way of accomplishing this would be to assign a subset of specific transaction identifiers having priorities to each bus master for selection by a bus master, thereby allowing a bus master to continue assigning transaction identifiers to it's transactions as previously described. However, one or more masters, or other modules, can be used to assign the transaction identifiers available to each module, or to assign a priority value assigned to each transaction identifier. In this manner, prioritization amongst data accesses between devices can also be maintained without having to prioritize a specific master over another at all times. As a further example, while the previous disclosure specifically described cross-point switch modules using the transaction identifiers to determine a priority of a transaction, other modules can use the techniques described to determine the priority amongst transactions. For example, a memory controller, such as the memory controller for a static RAM, or other device, can use the techniques described herein. In one such an embodiment, one of the slave devices of FIG. 1 would be a device capable of receiving multiple requests, and thereby be operable to prioritize the order of processing received request using the techniques described herein. Accordingly, the specification and figures are to be regarded in an illustrative rather than a restrictive sense and any and all such modifications and other changes are intended to be included within the scope of invention.

Any one or more benefits, one or more other advantages, one or more solutions to one or more problems, or any combination thereof have been described above with regard to one or more specific embodiments. However, the benefit(s), advantage(s), solution(s) to problem(s), or any element(s) that may cause any benefit, advantage, or solution to occur or become more pronounced is not to be construed as a critical, required, or essential feature or element of any or all the claims.

What is claimed is:

1. A method comprising:
   receiving a first indicator that a first information requested by a first transaction requested by a first device is available for processing, the first transaction associated with a first transaction identifier;
   receiving a second indicator that a second information requested by a second transaction requested by the first device is available for processing, the second transaction associated with a second transaction identifier selected to indicate a priority of the second transaction relative the first transaction;
   accessing stored information in one of a plurality of locations to determine a priority of the first information relative to the second information, wherein which of the plurality of locations to be accessed is determined by accessing select information stored at a select location; and
   transmitting the first information and the second information to the first device in an order based on the priority of the first information relative to the second information.

2. The method of claim 1 wherein the first and second indicators are received from second and third devices, respectively, indicating that the first information and the second information is ready for transfer to the first device from the second and third devices, respectively.

3. The method of claim 1 wherein determining the priority is in response to the first and second indicators indicating that the first information and the second information are available for processing at a common time.

4. The method of claim 1 further comprising
   transmitting the first information prior to the second information in response to determining the priority of the first information is higher than a priority of the second information; and
   transmitting the second information prior to the first information in response to determining the priority of the first information is lower than a priority of the second information.

5. The method of claim 1 wherein:
   associating the first and second transaction identifiers with the first and second transaction is performed by the first device;
   receiving the first indicator comprises receiving the first indicator from a second device indicating availability of the first information for transfer to the first device from the second device;
   receiving the second indicator comprises receiving the second indicator from a third device indicating availability of the second information for transfer to the first device from the third device;
   determining the priority is in response to the first and second indicators indicating that the first and second information are available for transfer at a common time comprises accessing stored information to determine the priority of the first information relative to the second information; and
   the method further comprising:
      transmitting the first information prior to the second information in response to determining the priority of the first information is greater than a priority of the second information; and
      transmitting the second information prior to the first information in response to determining the priority of the first information is less than a priority of the second information.

6. The method of claim 1 wherein:
   the second transaction identifier is at least partially selected based upon transaction request information provided by the first device.

7. An electronic system comprising:
   a first device comprising:
   a bus port; and
   a transaction identification module comprising an output coupled to the bus port to provide transaction identifiers to transaction requests initiated by the first device;
   a first storage location to store first indicators representative of priorities of corresponding transaction identifiers;
   a second storage location to store transaction identifiers representative of transactions awaiting processing by a second device; and
   the second device comprising:
      a controller comprising:
         a first bus port coupled to the bus port of the first device; and
         a priority module comprising an input coupled to the first and second storage locations, and an output to indicate a transaction associated with a transaction identifier stored in the second storage location to be processed to determine a relative priority of transactions awaiting processing based upon indexing the first location with a transaction identifier stored in the second storage location.

* * * * *